United States Patent [19]

Marie et al.

[11] 4,148,845
[45] Apr. 10, 1979

[54] GRAFT COPOLYMERS OF COPOLYMERS OF OLEFINS OR OF OLEFINS AND NON-CONJUGATED DIENES SUBSTRATES WITH UNSATURATED DERIVATIVES OF CYCLIC IMIDES GRAFTED THEREON

[75] Inventors: Gilbert Marie, Pau; André Lang, Billere; Gilbert Chapelet, Bron, all of France

[73] Assignee: Societe Nationale Elf Aquitaine, Courbevoie, France

[21] Appl. No.: 837,456

[22] Filed: Sep. 28, 1977

Related U.S. Application Data

[62] Division of Ser. No. 637,221, Dec. 3, 1975, Pat. No. 4,063,010.

[30] Foreign Application Priority Data

Dec. 12, 1974 [FR] France ................................. 7440949

[51] Int. Cl.$^2$ ...................... C08L 23/08; C08L 23/16
[52] U.S. Cl. ............................................... 260/878 R
[58] Field of Search .................................. 260/878 R

[56] References Cited

U.S. PATENT DOCUMENTS 3,766,302  10/1973  Holub et al. ..................... 260/878 R Primary Examiner—Harry Wong, Jr.
Attorney, Agent, or Firm—Burgess, Ryan and Wayne

[57] ABSTRACT

Novel amorphous copolymers of mono-olefins or of mono-olefins and non-conjugated dienes with unsaturated derivatives of imides are disclosed. These copolymers containing from 99.9 to 80% by weight of non-polar units derived from at least two mono-olefins containing 2 to 18 carbon atoms, particularly ethylene and propene or ethylene and butene-1, and possibly one or more non-conjugated dienes, and from 0.1 to 20% units derived from an imide having the formula:

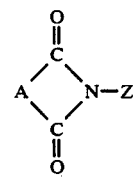

wherein: Z is an alkenyl radical containing 2 to 16 carbon atoms, and

A designates a saturated or unsaturated divalent hydrocarbon radical which contains 2 to 12 carbon atoms and which may possibly carry amino, halogen or carboxyl groups. Also disclosed are graft amorphous copolymers of amorphous copolymers of olefins or of olefins and non-conjugated dienes substrates with unsaturated derivatives of cyclic imides grafted thereon.

Some of said copolymers and said graft copolymers may be used as polymer additives in lubricating compounds to improve their viscosity index and to disperse the slurry which they may contain.

21 Claims, No Drawings

GRAFT COPOLYMERS OF COPOLYMERS OF OLEFINS OR OF OLEFINS AND NON-CONJUGATED DIENES SUBSTRATES WITH UNSATURATED DERIVATIVES OF CYCLIC IMIDES GRAFTED THEREON

CROSS REFERENCE TO RELATED APPLICATION

This application is a division of Application Ser. No. 637,221, filed Dec. 3, 1975, now U.S. Pat. No. 4,063,010.

The present invention relates to substantially amorphous novel copolymers of olefins or of olefins and non-conjugated dienes with unsaturated derivatives of cyclic imides. It also relates to the preparation of said copolymers as well as to the utilization of some of said copolymers as polymer additives for lubricating oils.

The copolymers according to the invention are substantially amorphous and contain from 99.9 to 80%, and preferably from 99.9 to 85% by weight of non-polar units derived from at least two mono-olefins containing 2 to 18 carbon atoms, and possibly one or more non-conjugated dienes, wherein the proportion of said diene or dienes in the copolymer is lower or equal to 20% by weight, and from 0.1 to 20%, preferably 0.1 to 15% polar units derived from one or more cyclic imides having the formula:

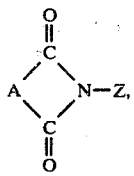

where: Z represents an alkenyl radical having 2 to 16 carbon atoms, and, A is a saturated or unsaturated divalent hydrocarbon radical containing 2 to 12 carbon atoms, which radical A may possibly carry amino, halogeno or carboxyl groups.

The mono-olefins containing 2 to 18 carbon atoms from which derive the whole, or only a part, of the non polar units may be advantageously alphaolefins of the formula $R\text{-}CH=CH_2$, where R designates hydrogen or an alkyl, aryl, aralkyl or alkaryl group having 1 to 16 carbon atoms, and particularly ethylene, propene, butene-1, pentene-1, hexene-1, methyl-4 pentene-1, octene-1; ethylene associated with an alpha-olefin having 3 to 6 carbon atoms, mainly propene or butene-1, is preferably used.

The non-conjugated dienes, from which up to 20% by weight of the copolymer units may possibly derive, can be linear or cyclic and may be selected particularly from the group comprising the 1,4 hexadiene methyl-2 pentadiene, 1,4-cyclopentadiene; 1,5-cyclooctadiene tetrahydro-4,7,8,9-indene, bicyclo-[3,2,0]-heptadiene-2,6, dicyclopentadiene, alkalidene-5-norbornene-2 such as, for instance, methylene-5-norbornene-2 and ethylidene-5-norbornene-2.

The N-alkenylated cyclic imides hereinabove defined from which the polar units of the copolymers according to the invention derive, are more particularly such as in the above indicated formula the alkenyl radical Z linked to the nitrogen atom contains 2 to 8 carbon atoms and presents preferably the unsaturation in the ω position relative to the nitrogen atom which it is linked to.

As examples of unsaturated cyclic imides which may produce the polar units of the copolymers according to the invention, may be mentioned, in a non-limitative way, those N-alkenylated derivatives of the imides which are selected from the group comprising succinimide, glutarimide, maleimide, citraconic imide phthalimide, the imide of himic anhydride, hexahydrophthalimide and the imides of tricarboxylic butane acid and of the esters of that acid, and particularly the N-vinylsuccinimide, N-allylsuccinimide, N-butenylsuccinimide, N-vinylmethyl-2 succinimide, N-vinyldimethyl-2,3 succinimide, N-vinylglutarimide, N-vinylmaleimide, N-vinylphthalimide, N-vinylcitraconimide, N-vinylhexahydrophthalimide, the N-vinyl imide of himic anhydride and the N-vinyl imide of tricarboxylic butane acid or the esters of that acid.

The copolymers of the invention may be substantially linear copolymers with a random distribution of the units which they are composed of, or also graftcopolymers wherein the units deriving from the cyclic unsaturated imides form hanging chains linked to a skeleton constituted by an amorphous random copolymer of the mono-olefins or of the mono-olefins and the non-conjugated diene or dienes forming the non-polar units.

The random copolymers are prepared by coordination catalysis through contacting, in a suitable liquid medium at a temperature between $-80°$ C. and $+150°$ C., at least two of the above-mentioned mono-olefins and possibly one or more non-conjugated dienes, with at least one of the unsaturated imides previously defined, used in the form of a complex with a Lewis acid, in the presence of a catalytic system formed by the association of an organometallic compound of one or more elements of class I, II or III of the Mendeleer Periodic Table with a compound of a transition metal of classes IV to VIII of said Periodic Table, until a copolymer is formed.

The unsaturated imides from which the polar units of the random copolymers derive are engaged in copolymerisation with the mono-olefins, and possibly with the non conjugated dienes, in the form of complexes with Lewis acids. A Lewis acid is any compound which may have the function of an acceptor of electronic doublets. Among the Lewis acids which may be used to complex the unsaturated imides, the alkylaluminium dihalides such as the ethylaluminium dichloride and ethylaluminium dibromide, the aluminium trihalides such as aluminium trichloride and aluminium tribromide, the boron halides such as boron trichloride, boron trifluoride etherate, the nickel halides such as nickel dichloride, may be mentioned in a non limitative way. The compound acting as Lewis acid with respect to the unsaturated imide is generally selected in such a way that the complex it forms with the imide has a higher stability than that of the reaction products which the non-saturated imide may form with the components of the coordination catalytic system used for the copolymerization. The complex between the Lewis acid and the unsaturated imide may be preformed before being introduced into the polymerization area, and for that purpose the said imide and the Lewis acid are dissolved in an inert solvent which may be liquid used as polymerization medium, maintained at a suitable temperature, e.g. between $-80°$ C. and $+80°$ C. The complex may also be formed in situ in the polymerization area before or during polymerization. The molar proportion of Lewis acid to be used to form the complex has to be at least equal to the stoichiometric quantity and may reach four times that quantity. Preferably the amount of Lewis acid used is such that the molar ratio of the Lewis acid to the unsaturated imide is between 1 and 3.

Catalytic systems particularly suitable for preparing copolymers according to the invention are formed by the association of organic compounds of aluminium with titanium, vanadium, tungsten or zirconium derivatives, e.g. halides, oxyhalides, compounds in which at least one of the valences of the transition metal is saturated by heteroatom, particularly oxygen or nitrogen, linked to an organic group such as the acetylacetonates, the benzoylacetonates and the alcoholates.

In some cases it may be advantageous to use a complex of the transition metal derivative with a ligand selected from the group comprising the aliphatic ethers such as diethyl and dipropyl ethers, diethoxyethane, the cyclic ethers such as tetrahydrofuran, dioxane, thioethers, phosphines, arsines, the tertiary amines such as trimethylamine, methyldiethylamine, the heterocyclic nitrogenous bases such as pyridine, quinoline, β-diketones, ketoesters, hydroxyaldehydes, aminoaldehydes, aminoalcohols.

It is particularly advantageous to use a catalytic system containing an organoaluminum substance of formula:

$$AlY_qCl_{(3-q)},$$

where: q is a number which may take the values 1, 3/2, 2 or 3, and

Y is a lower alkyl such as ethyl, propyl, isobutyl, hexyl, said organoaluminum substance being associated to a titanium halide such as $TiCl_4$ or to a vanadium halide or oxyhalide such as $VCl_4$, $VOCl_3$ or to vanadium acetylacetonate. The said titanium or vanadium halides may be complexed by tetrahydrofuran, an aliphatic ether, a tertiary amine, pyridine or quinoline.

The catalyst may possibly be deposited on a supporting medium or chemically bound to said supporting medium which may have an organic or inorganic nature.

The catalytic system may also contain a proportion of an activator which may particularly be an alkoxyalkyl halogenosulphite or halogenosulphate, such as ethoxyethyl chlorosulphite or chlorosulphate, a halogenosulphonyl-thiophene such as di[chlorosulphonyl]-2,4-thiophene, or a dichloroaryl-phosphine such as the dichlorophenylphosphine.

In order to form the catalytic system the organometallic compound and the compound of transition metal may be or may not be mixed together prior to being introduced into the polymerization area. The preformed catalyst may be introduced into the polymerization area in a continuous or in an intermittent way.

The activator, if present, may be mixed to the catalyst before the introduction into the polymerization area. The activator may also be added directly to the mixture during polymerization, in a continuous way or batchwise. With another operating method the activator is mixed first with the transition metal compound.

The catalytic system contains such amounts of organometallic compound and of transition metal compound that the ratio of the number of metal atoms of the organometallic compound to the number of metal atoms of the transition metal compound is between 1 and 50, and preferably between 2 and 30.

The amount of activator may vary within wide limits. Particularly, from 0.5 to 25 moles of activator may be used per transition metal atom but it is necessary that the polymerization medium contains more organometallic compound, expressed in metal atoms, than activator molecules.

The liquid medium in which the copolymerization takes place may advantageously be an aliphatic, aromatic or cycloaliphatic hydrocarbon solvent, particularly heptane, toluene, hexane, cyclohexane, benzene, or a mixture of such solvents. Inert halogenated hydrocarbons such as chloroform, chlorobenzene and tetrachlorothylene may also be used. The mono-olefins themselves may be used as the polymerization liquid medium and the copolymerization may be carried out in the olefin or olefins to be polymerized taken in the liquid state.

The preferred temperatures for carrying out the copolymerization range from −30° C. to +100° C. As to the pressures used for the copolymerization, they may range, for example, from 1 to 50 atmospheres, or even more.

The complex between the unsaturated imide and the Lewis acid may be introduced in its entirety into the polymerization area prior to the addition of the catalytic system, or may be introduced into said area during the polymerization process in a continuous or discontinuous way. The amount of said complex in the polymerization medium relative to the amount of organometallic derivative of the catalytic system is not critical and may be much higher than said amount of organometallic derivative.

The copolymerization may be carried out in a continuous way and, in that case, the liquid medium, the mono-olefins, the complexed nitrogeneous unsaturated derivative and the possibly present non-conjugated diene, as well as the catalytic system, are introduced in continuous operation into a polymerization area with such flow rates that they dwell in said area during a sufficient period of time for ensuring that the desired copolymer concentration in the reaction mixture is obtained.

In carrying out the copolymerization process, any free oxygen is eliminated from the reaction medium, as well known in the art, by passing an inert gas, particularly nitrogen, through said medium, prior to the polymerization.

The duration of the copolymerization process varies generally according to the operating conditions, and is most often comprised between 20 minutes and 4 hours.

At the end of the operation the catalyst is destroyed in a well known way, e.g. by adding an alcohol to the reaction mixture, then the copolymer is separated from the solvent by coagulation by means of addition of an alcohol, by stripping off the solvent or by any other method enabling to separate a polymer from a solution in which it is contained.

When the copolymers according to the invention are graft-copolymers, they result from the grafting of a suitable amount of one or more of the unsaturated imides giving the polar units on an amorphous stabistical copolymer of the mono-olefins, or of the mono-olefins and the non-conjugated diene or dienes, giving the non polar units.

The grafting method is not critical and any grafting method known in the art may be used to graft a vinyl monomer onto a copolymer of olefins or of olefins and non-conjugated dienes.

The graft copolymer may be advantageously prepared by the method which comprises the steps of dissolving the amorphous copolymer of mono-olefins or of mono-olefins and non-conjugated dienes in a solvent, for example a solvent of the type used for the statistical copolymerization and particularly a hydrocarbon, adding a free radical initiator, particularly a peroxide such as benzoyl peroxide, then raising the mixture obtained to the grafting temperature and maintaining it at said grafting temperature for a sufficient period of time to form active sites on the amorphous copolymer, then adding the unsaturated imide or imides in a suitable amount and allowing the substances present to react at the grafting temperature in order to produce the graftcopolymer.

The graft-copolymer may then be separated from the grafting reaction medium by any known method and, for example, by washing the solution of graftcopolymer with a suitable solvent, preferably a sovlent of the corresponding monomer or homopolymers, then, after decantation, by precipitation, by addition of an alcohol, of the graft-polymer contained in the organic phase particularly isopropanol. The separated graftpolymer is then oven-dried under low pressure.

Some of the copolymers according to the invention may be incorporated, in minor amounts, in a lubricating oil, possibly with other additives, to form improved lubricating compositions having a much better viscosity index than the oil per se, as well as a satisfactory dispersing power with respect to the slurry (insoluble deposits) which may be formed in the oil.

The copolymers according to the invention which are adapted to be used as polymer additives for lubricating oils are copolymers containing, by weight, x% units derived from ethylene, y% units derived from a mono-olefin having 3 to 6 carbon atoms or from a mono-olefin having 3 to 6 carbon atoms and an non-conjugated diene, the proportion of units stemming from the diene being at most equal to 20% by weight, and z% units derived from one or more of the unsaturated imides previously defined, the values of x,y and z being such that $5 \leq x \leq 75$, $5 \leq y \leq 85$, and $0.1 \leq z \leq 20$ with $(x+y+z)=100$, said copolymers having also a reduced viscosity as measured in a solution at 0.1% in decalin at 135° C., comprised between 0.5 and 2, and a polydispersity lower than 5.

reduced viscosity of the polymer additives, as measured in a 0.1% solution in decalin at 135° C., which may vary as previously indicated from 0.5 to 2, is preferably comprised between 0.7 and 1.7.

As to the polydispersity of said additives, which has to be lower than 5, it is preferably lower than 4, and more particularly between 2 and 3.5.

It should be recalled that the polydispersity of a polymer is defined by the value of the ratio of its weight average molecular weight $M_w$ to its number average molecular weight $M_n$.

A range of preferred polymer additives is formed by the terpolymers of ethylene and propene or butene-1 with one of the previously mentioned unsaturated imides, mainly one of the imides for which, in the hereinabove formula defining them, the alkenyl radical Z linked to the nitrogen atom is an alkenyl radical having 2 to 8 carbon atoms with, preferably, the unsaturation in the ω position relative to said nitrogen atom, said N-alkenylated imides being more particularly derived from succinimide, glutarimide, phthalimide, maleimide, citraconic imide, the imide of himic anhydride, hexahydrophthalimide and the imide of butanetricarboxylic acid or of the esters of this acid.

For the range of preferred additives the ponderal proportions x, y and z of the units deriving respectively from ethylene, propene or butene-1 and from the unsaturated imide are preferably such that $20 \leq x \leq 75$, $20 \leq y \leq 75$, and $0.10 \leq z \leq 15$ with $(x+y+z)=100$.

When the copolymers according to the invention which may be used as additives for lubricating oils are obtained by grafting a suitable amount of the above mentioned unsaturated imide or imides on an amorphous copolymer of ethylene with the mono-olefin having 3 to 6 carbon atoms, mainly propene or butene-1, or with the mono-olefin having 3 to 6 carbon atoms and the non-conjugated diene, said amorphous copolymer used as a substrate has a reduced viscosity, as measured in a 0.1% solution in decalin at 135° C., and a polydispersity comprised in the ranges hereinabove defined; i.e. a reduced viscosity comprised between 0.5 and 2, preferably comprised between 0.7 and 1.7, and also a polydispersity lower than 5, and more particularly a polydispersity between 2 and 3.5.

When preparing the polymer additive by statistical copolymerization or by grafting, it may be advantageous to operate in a solvent constituted by an oil having the same composition as that of the oil to which the additive has to be added, as it is not then necessary to isolate the additive which can be collected in the form of a concentrated solution in the oil used as the solvent.

The incorporation of the polymer additive to the lubricating oil may be performed by any known method. In most cases, concentrated solutions of additives, called mother solutions are prepared and diluted when used to obtain the desired additive concentration in the lubricating composition.

The concentration of the polymer additive in the lubricating composition is generally of about 0.2 to 10%, and preferably 0.5 to 5% by weight when said lubricating composition is ready for use. However higher concentrations, e.g. 15 to 30%, may be considered when the lubricating composition has the form of a concentrate which is diluted in a suitable way when used.

The lubricating oils in which the polymer additive is incorporated to form the improved lubricating compositions may be natural or synthetic lubricating oils, or mixtures of such oils. As non-limitative examples of such oils the following may be mentioned: vegetable oils such as castor oil, ordinary or refined mineral oils of the paraffinic and/or naphthenic type, hydrorefined oils, asphaltic oils, synthetic oils such as the polybutenes or the alkylbenzenes such as dinonylbenzene and tetradecylbenzene, the alkyl and aryl ethers and/or esters of polyoxyalkylene such as ethers and/or esters of polyisopropyleneglycol, the esters or dicarboxylic acids and of various alcohols such as dibutyl adipate and dioctyl phthalate, the so-called silicone oils such as, for example, the polysiloxanes, the total or partial esters of the phosphoric acid, for example the tricresylphosphate and the alkylphosphoric acids.

In addition to the polymer additives according to the invention, the lubricating compositions may also contain other additives commonly used in the art as corrosion inhibitors, antioxidants, dyes, defoaming agents.

The improved lubricating compositions containing the polymer additives according to the invention may be used particularly as crank-case oils for internal combustion engines, as axle-case oils, as lubricants for gears or for the machining of metals, or also as lubricants for two-stroke engines.

The following examples will illustrate the invention; however they are not to be construed as limiting its scope.

EXAMPLE 1

The copolymerization was carried out in a cylindrical reactor having a capacity of 6 liters, said reactor being provided with a stirrer, a dropping funnel for introducing the unsaturated imide, two dropping funnels for introducing the catalytic couple and tubes for the inlet and outlet of gases. The reactor was immersed in a thermostatic bath and its temperature was maintained during the entire copolymerization process at 20° C.

The funnels above the reactor were purged and maintained under a nitrogen atmosphere. 70 millimoles of a complex of N-vinylsuccinimide and ethylaluminium dichloride diluted in 100 millimoles of benzene were introduced into the bulb provided for introducing the unsaturated imide; said complex was prepared by mixing in benzene, at a temperature of about 10° C, N-vinylsuccinimide and ethylaluminium dichloride in molar ratio 1/1.

8 millimoles of vanadium tetrachloride (VCl$_4$) in 100 milliliters of anhydrous heptane were introduced into one of the funnels provided for the catalytic system, and 64 millimoles of ethylaluminium sesquichloride in 100 milliliters of anhydrous heptane were introduced into the other one.

3.7 liters of heptane previously dried and degassed were introduced into the reactor maintained under a nitrogen atmosphere. The flow of nitrogen was stopped, then a mixture of ethylene and propene in a molar ratio propene/ethylene equal to 1.2 was introduced through the gas inlet tube, said mixture circulating at a rate of 100 liters (normal) per hour during the whole copolymerization.

Twenty minutes after beginning to introduce the gas mixture, the complexed unsaturated imide and the components of the catalytic system were injected drop by drop, the introduction of the monomer and that of the catalysts being carried out each in 100 minutes; then the injection of the olefins is carried on for 10 minutes more. At the end of the reaction, an antioxidant was added to the reaction medium which is then subsequently treated with water containing, by weight, 0.2% acetylacetone and 1% acetic acid.

138g of a statistical terpolymer was collected, in the form of a non-vulcanized elastomer which was amorphous as shown by X-ray examination, and which has a reduced viscosity (0.99), as measured in a 1% solution in decalin at 135° C., and a polydispersity of 3.

This terpolymer contained, by weight, 0.1% nitrogen, which corresponded to 0.9% units derived from the N-vinylsuccinimide, 43% units derived from propene and 56.1% units derived from ethylene.

In order to study the effet of the polymer additive thus prepared on the viscosity index (VI$_E$) of the lubricating oils, a determination of the viscosity index (VI$_E$) was made, according to the ASTM-D 2270 standard, on a lubricating composition obtained by addition of 1.5% by weight of terpolymer to an oil referenced "200 Neutral" (neutral paraffin oil extracted by a solvent and having a viscosity of 44.1 centistokes at 37.8° C., and of 6.3 centistokes at 98.9° C., and a viscosity index of 100).

For the purpose of comparison the determination has also been made of the viscosity index of a similar lubricating composition wherein the terpolymer according to the invention was replaced by the same amount of a reference sample constituted by an amorphous copolymer of ethylene and propene containing 54.4% by weight ethylene and having a reduced viscosity of 1.10 (as measured in decalin at 135° C.), and a polydispersity of 3.

The viscosity index (VI$_E$) of an oil is a value based on a conventional scale, and characterizing the variation of the viscosity of the oil as a function of temperature; said index (VI$_E$) increases as said variation decreases.

The results obtained are listed in Table I.

TABLE I

| | "200 Neutral" oil + 1.5% additive | | |
|---|---|---|---|
| | Viscosity at | | |
| | 37.8° C. (cSt) | 98.9° C. (cSt) | VI$_E$ |
| Terpolymer | 95.70 | 12.65 | 138 |
| Reference sample | 100.30 | 12.99 | 136.5 |

The incorporation of the terpolymer according to the invention in the above mentioned lubricating oil considerably improves the viscosity index of that oil. Moreover, a comparison between the results obtained with the terpolymer according to the invention and the reference sample copolymer showed that the terpolymer had an influence on the viscosity index which is higher than that of the reference sample copolymer The dispering properties of the terpolymer according to the invention and of the reference copolymer were evaluated by means of a test called "stain test method" which is carried out at 20° C. and at 200° C., operating as follows:

-Stain test at 20° C.:

1.4g of a mother solution of polymer additive in a neutral oil of the "200 Neutral" type was poured into a flask of 60 ml, then was completed to 20g with a used oil containing about 2.4% slurry (insoluble deposits), the mixture obtained containing then 1.05% polymer additive and 93% used oil. The said mixture was finely divided and homogenized during two minutes by means of a turbine rotating at 20,000 rpm, the temperature of the mixture being about 50° C., then the thus prepared mixture was allowed to rest during 12 hours.

On a filter paper (Durieux ® type n° 122) maintained completely flat, a drop of the mixture was then deposited by means of a calibrated glass rod (diameter 6 mm) placed 1 cm above the paper.

The stains were examined visually after 48 hours and were each given a qualification mark from 0 to 10 according to the following quotation scale:

| Dispersion | Qualification mark (base 10) |
|---|---|
| Very good | 9 to 10 |
| Good | 7 to 8 |
| Poor to medium | 4 to 6 |
| Null to very bad | 0 to 1 |

-Stain at 200° C.:

The reference sample was prepared in the same way as that for the stain test at 20° C., and is also left resting for 12 hours.

2 cm$^3$ of the sample was then taken off and put into a test tube which was immersed for 3 minutes in an oil bath at 200° C. A drop of that sample oil was then immediately deposited on a filter paper in a manner similar to that described with reference to the stain test at 20° C., and 48 hours later the stains are given a qualification mark according to the visual examination scale indicated herein above.

The results obtained are listed on table II.

| Type of test | additive | Qualification mark (base 10) |
|---|---|---|
| stain at 20° C. | Terpolymer | 8.5 |
| | Reference copolymer | 0.5 |
| stain at 200° C. | Terpolymer | 8 |
| | Reference copolymer | 0 |

The qualification mark resulting from the stain test at 20° C. in the case of the "200 Neutral" oil without polymer additive was 0.5.

EXAMPLE 2

A terpolymer according to the invention, which is adapted to be used as an additive for lubricating oils, was prepared by grafting N-vinylsuccinimide on a statistic copolymer of ethylene and propene having an ethylene content of 48% (by weight) and a reduced viscosity of 1.57 (as measured in decalin at 135° C.), a polydispersity of about 3 and a total ash content of 200 ppm.

In a reactor provided with a stirring device, having a capacity of 1 liter and being maintained by thermostatic means at 93° C., 300 ml heptane and 12g of the ethylene/propene copolymer were introduced. 2 mmoles of benzoyle peroxide was added and the resulting mixture was heated to 93° C. and maintained at that temperature for 45 minutes. 0.35g N-vinylsuccinimide was then added and the temperature was maintained at 93° C. for two hours.

The hot solution was then washed with demineralised water and, after decantation, the polymer contained in the organic phase was precipitated by means of isopropanol.

The graft copolymer obtained has a reduced viscosity of 1.14 (as measured in a 0.1% solution in decalin at 135° C.) and a N-vinylsuccinimide content of 0.4% by weight.

In order to evaluate the effect of the graft terpolymer thus obtained on the viscosity index of the lubricating oils, as well as its dispersing power, a lubricating composition (oil+graft terpolymer) containing 1.5% by weight of terpolymer, was prepared, starting from the reference oil "200 Neutral", then the viscosity index ($VI_E$) of that composition was determined as well as its dispersing power due to the incorporation of the terpolymer as indicated in Example 1.

The viscosity at 37.8° C. and 98.9° C. of said composition was respectively 109.85 and 13.91 centistokes, which gave a viscosity index ($VI_E$) of 137.

As regards the dispersing effect, the qualification marks 7.2 and 6.8 (base 10) according to the stain test method were found respectively at 20° C. and 200° C., which indicated a high dispersion capacity, and thus a satisfactory dispersing power of the graft terpolymer.

What is claimed is:

1. An amorphous graft copolymer containing from 99.9 to about 80% by weight of an amorphous random copolymer substrate comprising non polar units, 80 to 100% of said non polar units being derived from two or more mono olefins having the formula R-CH=CH$_2$ wherein R is a hydrogen atom or an alkyl radical having 1 to 16 carbon atoms and up to about 20% are derived from one or more non-conjugated dienes selected from the group consisting of 1,4-hexadiene, methyl-2-pentadiene, 1,4-cyclopentadiene, 1,5-cyclooctadiene, tetrahydro-4,7,8,9-indene, bicyclo(3,2,0)heptadiene-2,6, dicyclopentadiene, and alkylidene-5-norbornene-2, having grafted thereon from 0.1 to 20% by weight of polar units from one or more cyclic imides having the formula

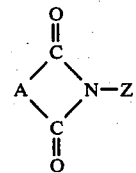

wherein Z is an alkenyl radical having 2 to 16 carbon atoms and wherein A is a hydrocarbon radical selected from the group consisting of saturated bivalent hydrocarbon radicals having 2 to 12 carbon atoms, unsaturated bivalent hydrocarbon radicals having 2 to 12 carbon atoms, amino, halogeno and carboxyl substituted bivalent saturated or unsaturated hydrocarbon radicals having 2 to 12 carbon atoms, said amorphous random copolymer substrate being obtained by contacting, at a temperature from −80° C. to 150° C., a member selected from the group consisting of a mixture of two or more of said monoolefins, and a mixture of two or more of said monoolefins with one or more of said non-conjugated dienes in the presence of a catalytic system formed by the association of an organometallic compound of one or more elements of the Groups I, II, and III of the Mendeleev Periodic Table of the Elements with a compound of a transition metal of groups IV to VIII of said Periodic Table.

2. A copolymer of claim 1 wherein the polar units are derived from N-alkenylimides wherein the alkenyl group contains 2 to 8 carbon atoms.

3. A copolymer according to claim 1 wherein the polar units are derived from N-alkenylimides wherein the imide group is selected from the group consisting of succinimide, glutarimide, maleimide, phthalimide, citraconic imide, hexahydrophthalimide, the imide of himic anhydride, and the imides of the butane tricarboxylic acid and the esters of said acid.

4. A copolymer according to claim 1, wherein the non-polar units in the substrate are derived from ethylene and a monoolefin having 3 to 6 carbon atoms.

5. A copolymer according to claim 1, wherein the non-polar units in the substrate are derived from ethylene, a mono olefin having 3 to 6 carbon atoms and a non-conjugated diene.

6. A copolymer according to claim 1 wherein the non-polar units in the substrate are derived from ethylene and propene.

7. A copolymer according to claim 1 wherein the non-polar units in the substrate are derived from ethylene and butene-1.

8. A copolymer according to claim 2 wherein the N-alkenylimides contain an alkenyl radical which is unsaturated in the omega position relative to the nitrogen atom to which it is linked.

9. A copolymer according to claim 1 wherein the alkylidene-5-norbornene-2 is selected from the group consisting of methylene-5-norbornene-2, ethylidene-5-norbornene-2 and mixtures thereof.

10. An amorphous graft copolymer containing from 99.9 to about 80% by weight of an amorphous random copolymer substrate comprising non polar units, 80 to 100% of said non polar units being derived from ethylene and a monoolefin having 3 to 6 carbon atoms and up to about 20% are derived from one or more non-conjugated dienes selected from the group consisting of 1,4-hexadiene, methyl-2-pentadiene, 1,4-cyclopentadiene, 1,5-cyclooctadiene, tetrahydro-4,7,8,9-indene, bicyclo (3,2,0) heptadiene-2,6, dicyclopentadiene, and alkylidene-5-norbornene-2, having grafted thereon from 0.1 to 20% by weight of polar units from one or more cyclic imides having the formula

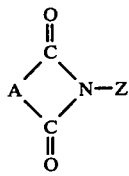

wherein Z is an alkenyl radical having 2 to 16 carbon atoms and wherein A is a hydrocarbon radical selected from the group consisting of saturated bivalent hydrocarbon radicals having 2 to 12 carbon atoms, unsaturated bivalent hydrocarbon radicals having 2 to 12 carbon atoms, amino, halogeno and carboxyl substituted bivalent saturated or unsaturated hydrocarbon radicals having 2 to 12 carbon atoms, said copolymer having a reduced viscosity, as measured in a 0.1% solution in decalin at 135° C., varying between 0.5 and 2 and a polydispersity less than 5, said amorphous random copolymer substrate being obtained by contacting, at a temperature from −80° C. to 150° C., a member selected from the group consisting of a mixture of ethylene and a monoolefin having 3 to 6 carbon atoms, and a mixture of ethylene, a monoolefin having 3 to 6 carbon atoms and one or more of said non-conjugated dienes, in the presence of a catalytic system formed by the association of an organometallic compound of one or more elements of the Groups I, II and III of the Mendeleev Periodic Table of the Elements, with a compound of a transition metal of groups IV to VIII of said Periodic Table.

11. A copolymer according to claim 10 wherein the polar units are derived from N-alkenylimides wherein the alkenyl group contains 2 to 8 carbon atoms.

12. A copolymer according to claim 10 wherein the polar units are derived from N-alkenylimides wherein the imide group is selected from the group consisting of succinimide, glutarimide, maleimide, phthalimide, citraconic imide, hexahydrophthalimide, the imide of himic anhydride, and the imides of butane tricarboxylic acid and the esters of said acid.

13. A copolymer according to claim 10 wherein the non-polar units in the substrate are derived from ethylene and propene.

14. A copolymer according to claim 10 wherein the non-polar units in the substrate are derived from ethylene and butene.

15. A copolymer according to claim 11 wherein the N-alkenyl imides contain an alkenyl radical which is unsaturated in the omega position relative to the nitrogen atom to which it is linked.

16. A copolymer according to claim 10 wherein said alkylidene-5-norbornene-2 is methylene-5-norbornene-2 or ethylidene-5-norbornene-2.

17. A copolymer according to claim 10 containing, by weight, x% units from ethylene, y% units from monoolefins having 3 to 6 carbon atoms or from mono-olefins having 3 to 6 carbon atoms and non-conjugated dienes, and z% units from N-alkenylated imides, the values of x, y and z being such that $5 \leq x \leq 75$, $5 \leq y \leq 85$ and $0.1 \leq z \leq 20$ with $(x+y+z) = 100$, said copolymer further having a reduced viscosity, as measured in solution at 0.1% in decalin at 135° C., comprised between about 0.5 and 2 and a polydispersity less than 5.

18. A copolymer according to claim 17, wherein said reduced viscosity is between 0.7 and 1.7.

19. A copolymer according to claim 17, wherein said polydispersity is less than 4.

20. A copolymer according to claim 17, wherein said polydispersity is between 2 and 3.5.

21. A copolymer according to claim 17, containing, by weight, x% units from ethylene, y% units from propene or butene-1, and z% units from one or more of the unsaturated imides, the values x, y and z being such that $20 \leq x \leq 75$, $20 \leq y \leq 75$ and $0.15 \leq z \leq 15$, $(x+y+z)$ being equal to 100.

* * * * *

UNITED STATES PATENT OFFICE
CERTIFICATE OF CORRECTION

Patent No. 4,148,845     Dated April 10, 1979

Inventor(s)  Gilbert Marie, et al

It is certified that error appears in the above-identified patent and that said Letters Patent are hereby corrected as shown below:

Column 1, line 54:  Insert a comma after "hexadiene".

line 55:  Insert a comma after "cyclooctadiene".

line 57:  "alkalidene" should be --alkylidene--.

Column 2, line 14:  "or the esters" should be --or of the esters--.

line 34:  "Mendeleer" should be --Mendeleev--.

line 62:  After "be" insert --the--.

Column 3, line 11:  After "by" insert --a--.

Column 4, line 61:  "stabistical" should be --statistical--.

Column 5, line 19:  "sovlent" should be --solvent--.

line 37:  "an" should be --a--.

line 47:  "reduced" should be --The reduced--.

Column 7, line 58:  "effect" should be --effect--.

Column 8, line 30:  "dispering" should be --dispersing--.

UNITED STATES PATENT OFFICE
CERTIFICATE OF CORRECTION

Patent No. 4,148,845                     Dated April 10, 1979

Inventor(s) Gilbert Marie, et al

It is certified that error appears in the above-identified patent and that said Letters Patent are hereby corrected as shown below:

Column 10, line 49:   "and the esters" should be --and of the esters--.

Column 12, line 12:   "and the esters" should be --and of the esters--.

Signed and Sealed this

Eighteenth Day of September 1979

[SEAL]

*Attest:*

*Attesting Officer*          LUTRELLE F. PARKER
                             *Acting Commissioner of Patents and Trademarks*